(12) United States Patent
Reel

(10) Patent No.: US 7,789,465 B2
(45) Date of Patent: Sep. 7, 2010

(54) HEADREST ADJUSTMENT AND LOCK MECHANISM AND METHOD

(75) Inventor: Travis Matthew Reel, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/013,005

(22) Filed: Jan. 11, 2008

(65) Prior Publication Data

US 2009/0179474 A1     Jul. 16, 2009

(51) Int. Cl.
*A47C 1/10* (2006.01)
(52) U.S. Cl. ............... 297/410; 297/391; 297/463.1
(58) Field of Classification Search .......... 297/410, 297/391, 463.1
See application file for complete search history.

(56) References Cited

U.S. PATENT DOCUMENTS

| | | | |
|---|---|---|---|
| 5,529,379 A | | 6/1996 | Stocker |
| 5,775,777 A | | 7/1998 | Delling |
| 5,927,813 A | * | 7/1999 | Nemoto ............... 297/391 |
| 6,655,742 B1 | * | 12/2003 | Ozaki ................. 297/410 |
| 6,802,565 B2 | | 10/2004 | Isaacson |
| 6,969,118 B2 | * | 11/2005 | Yamada ............... 297/410 |
| 7,121,626 B2 | | 10/2006 | Akehi et al. |
| 7,159,946 B2 | * | 1/2007 | Gurtatowski et al. ........ 297/410 |

\* cited by examiner

*Primary Examiner*—Laurie K Cranmer
(74) *Attorney, Agent, or Firm*—Kenealy Vaidya LLP; Mark E. Duell

(57) ABSTRACT

A headrest lock guide assembly for removably securing a headrest assembly to a vehicle seat can include a lock housing configured to house a headrest post extending through the lock housing, a lock slidably located within the lock housing, and a tool passageway extending through the housing. The lock can be slid against a spring force between a locked and unlocked position by inserting a tool through the tool passageway in the lock housing. A lock housing cover can be provided that is non-movably secured to the lock housing and can include a cover abutment surface adjacent to and blocking a lock body opening in the housing. The lock can include a lock abutment surface and a post engagement member configured and dimensioned to selectively engage a portion of the headrest assembly to lock the portion of the headrest assembly within the lock guide. The lock is movable within the lock cavity between a locked position in which the post engagement member extends over a portion of a through bore and the lock abutment surface contacts the cover abutment surface, and an unlocked position in which the post engagement member is located outside the perimeter of the through bore in the hollow post stem and the lock abutment surface is spaced from the cover abutment surface. A spring member can bias the lock into the locked position.

20 Claims, 3 Drawing Sheets

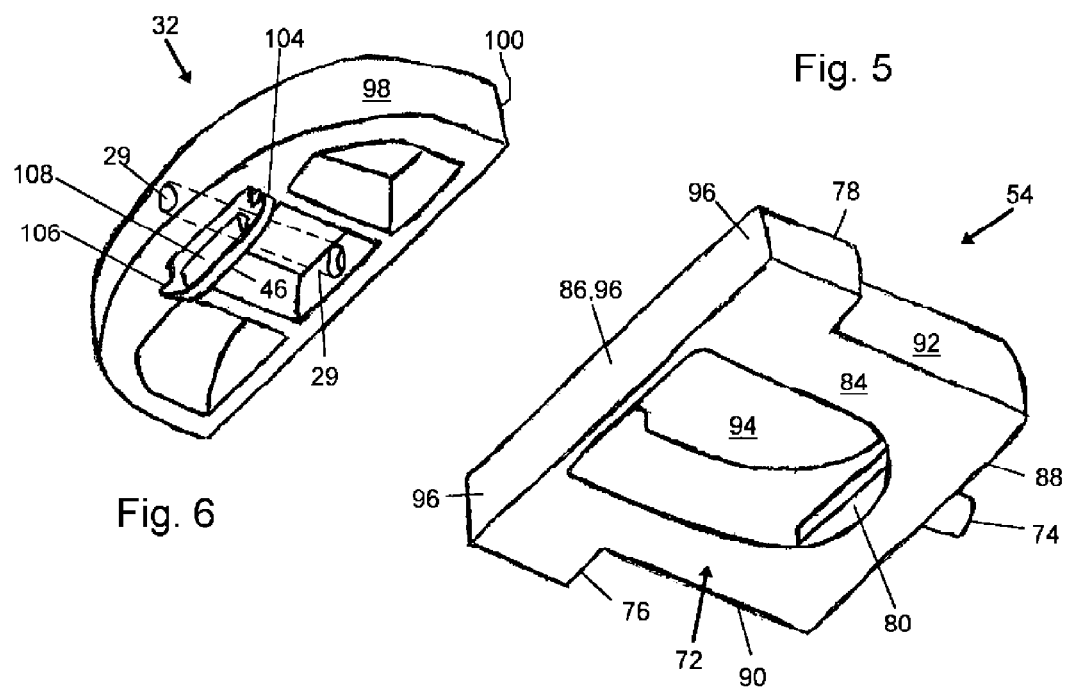
Fig. 5
Fig. 6
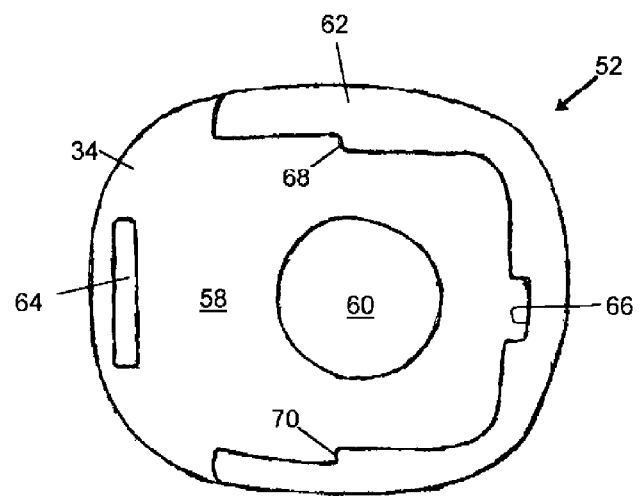
Fig. 4

HEADREST ADJUSTMENT AND LOCK MECHANISM AND METHOD

BACKGROUND

1. Field

The present invention relates to a headrest adjustment and lock mechanism and method, and in particular to a headrest lock guide assembly, for removably securing a headrest assembly to a vehicle seat, and the associated method of use.

2. Description of the Related Art

A vehicle seat can have a headrest that can be adjusted in its height relative to the seat back to accommodate occupants of various heights. Typically, these adjustable headrests can be locked into one of a plurality of height positions by a spring biased lock.

One example of a headrest lock structure is described in U.S. Pat. No. 7,121,626 to Akehi et al. (Akehi et al.). Referring to FIG. 1A of Akehi et al., a lock plate or lock member 2 can be fitted into one of three lock slots 4a formed in the headrest pole 1 to allow the height of the headrest to be freely adjusted. As shown in FIGS. 4A and 4B of Akehi et al., the lock plate 2 is fixed to a lock-releasing knob 16 that is biased by a spring 5 such that the lock plate 2 is fitted into one of the lock slots 4a. With reference to FIGS. 1A, 1B, 4B and 5B of Akehi et al., a user may increase the height of the headrest relative to the seat back by applying a force upwardly on the headrest until the lock plate 2 engages the flat upper side surface 42 of one of the lock slots 4. In order to lower the headrest relative to the seat back, a user must push the knob 16 against the biasing force of the coil spring to move the lock plate 2 out of engagement with one of the lock slots 4a.

Many vehicles have seats that can be folded to provide a flat cargo area in the vehicle cabin. In such vehicles, it may be desirable to remove the headrest from the seat when the seat is in the folded position.

In the headrest lock structure disclosed by Akehi et al., the user must apply a force upwardly on the headrest until the lock plate 2 engages the lowest lock slot 4b. Engagement of the lock plate 2 with the lock slot 4b prevents further upward displacement of the headrest. In order to remove the headrest from the seat back, the use must push on the knob 16 and against the bias of the coil spring 5 to disengage the lock plate 2 from the lock slot 4b. Then, the user can remove the headrest by applying an upward force on the headrest while pushing on the knob 16 until the lock slot 4b moves upwardly beyond the lock plate 2.

In contrast to the headrest lock structure of Akehi et al., U.S. Pat. No. 6,655,742 to Ozaki discloses a locking/unlocking mechanism for a headrest H that employs two separate mechanisms—one for adjusting the height of the headrest H and another one for preventing removal of the headrest H from the seat back. The locking/unlocking mechanism of Ozaki includes a stopper notch 10 on a first headrest stay 1, and plural notches 11 on a second headrest stay 1A. First and second headrest holders 2, 2' supportively receive the respective first and second stays 1, 1A. The second headrest holder 2 is provided with a known headrest vertical adjustment mechanism, as generally designated by M, in the head 2T' thereof, which works to lockingly engage a selected one of the plural notches 11, so that the user can adjustably raise and lower the headrest H.

In order to remove the headrest H from the seat back, a user has to draw the headrest H upwardly from the headrest holders 2, 2' until the stopper notch 10 until the lock member 20 is quickly moved by the biasing force of the springs 25, causing the engagement edge 20C-1 of the lock hole 20C to engage the stopper notch 10. Then, the user should lower the headrest H a slight amount so as to cause disengagement of the stopper notch 10 from the lock hole 20C. Next, an unlocking tool T is inserted into the tool insertion hole 20D to prevent withdrawal of the lock member 20 caused by the biasing force of springs 25 in the unlocking direction. Finally, the user can remove the headrest H from the headrest holders 2, 2'.

SUMMARY

According to one aspect of the disclosure, a headrest lock guide assembly for removably securing a headrest assembly to a vehicle seat can include a lock housing having a separate lock housing cover, a hollow post stem, a lock and a spring. The lock housing can include an inner surface defining a lock cavity, a lock body opening in communication with the lock cavity, and a post opening in communication with the lock cavity. The lock housing cover is non-movably secured to a main portion of the lock housing and can include an outer surface, a cover abutment surface, and a tool passage. The cover abutment surface is adjacent the lock body opening and blocks the lock body opening. The tool passage extends from the outer surface to the cover abutment surface and is in direct communication with the lock body opening. The hollow post stem extends from the first lock housing and can include a through bore coaxial with the post opening. The through bore is dimensioned and configured to slidably receive a portion of the headrest assembly. The lock is in the lock cavity and can include a lock abutment surface and a post engagement member configured and dimensioned to selectively engage the portion of the headrest assembly to lock the portion of the headrest assembly within the lock guide. The lock is movable within the lock cavity between a locked position such that the post engagement member extends over a portion of the through bore and the lock abutment surface contacts the cover abutment surface and an unlocked position such that the post engagement member is located outside the perimeter of the through bore and the lock abutment surface is spaced from the cover abutment surface. The spring is in the lock housing and has a first end and a second end. The second end of the spring engages the lock to bias the lock into the locked position.

According to another aspect of the disclosed subject matter, a headrest lock guide assembly for removably securing a headrest assembly to a vehicle seat can include a lock housing with lock housing cover, a hollow post stem, a lock, and a spring. The lock housing can include an inner surface defining a lock cavity, a lock body opening in communication with the lock cavity, and a post opening in communication with the lock cavity. The lock housing cover can be non-movably secured to another portion of the lock housing and can include an outer surface, a cover abutment surface, and a tool passage. The cover abutment surface is adjacent the lock body opening and blocks the lock body opening. The tool passage extends from the outer surface to the cover abutment surface. The hollow post stem extends from the first lock housing and includes a through bore coaxial with the post opening. The through bore is dimensioned and configured to slidably receive a portion of the headrest assembly. The lock is in the lock cavity and can include a lock abutment surface and a post engagement member configured and dimensioned to selectively engage the portion of the headrest assembly to lock the portion of the headrest assembly within the lock guide. The lock can be movable in a direction parallel to the tool passage within the lock cavity between a locked position such that the post engagement member extends over a portion of the through bore and the lock abutment surface contacts the cover abutment surface and an unlocked position such that the post engagement member is located outside the perimeter of the through bore and the lock abutment surface is spaced from the cover abutment surface. The spring is in the lock housing and has a first end and a second end. The second end of the spring engages the lock to bias the lock into the locked position.

According to yet another aspect of the disclosed subject matter, a headrest lock guide assembly for removably securing a headrest assembly to a vehicle seat can include a lock housing, a lock housing cover, a hollow post stem, a lock, and spring. The lock housing can include an inner surface defining a lock cavity, a lock body opening in communication with the lock cavity, and a post opening in communication with the lock cavity. The lock housing cover is non-movably secured to the lock housing and can include an outer surface, a cover abutment surface, and a tool passage. The outer surface terminates at the cover abutment surface. The cover abutment surface is adjacent the lock body opening and blocks the lock body opening. The tool passage extends from the outer surface to the cover abutment surface. The hollow post stem extends from the first lock housing and can include a through bore coaxial with the post opening. The through bore is dimensioned and configured to slidably receive a portion of the headrest assembly. The lock is in the lock cavity and can include a lock abutment surface and a post engagement member configured and dimensioned to selectively engage the portion of the headrest assembly to lock the portion of the headrest assembly within the lock guide. The lock is movable within the lock cavity between a locked position such that the post engagement member extends over a portion of the through bore and the lock abutment surface contacts the cover abutment surface and an unlocked position such that the post engagement member is located outside the perimeter of the through bore and the lock abutment surface is spaced from the cover abutment surface. The spring is in the lock housing and having a first end and a second end. The second end of the spring engages the lock to bias the lock into the locked position.

According to still another aspect of the disclosed subject matter, a headrest lock guide assembly for removably securing a headrest assembly to a vehicle seat can include a lock housing including an inner surface defining a lock cavity, a post opening having a post opening axis, the post opening being in communication with the lock cavity and configured to receive a headrest post extending along the post opening axis through the post opening, and a tool passage extending from an outer surface of the lock housing to the lock cavity along a tool passage axis. A lock can be located in the lock cavity and include a lock abutment surface facing the tool passage and a post engagement member configured and dimensioned to selectively engage a portion of the headrest assembly to lock the portion of the headrest assembly within the lock guide, the lock being movable within the lock cavity between a locked position in which the post engagement member extends into a portion of the post opening when viewed along the post opening axis and an unlocked position in which the post engagement member is located further from the post opening axis than when the lock is in the locked position, the lock configured to move in a direction substantially parallel to the tool passage. A spring member can be located in the lock housing and configured to provide a spring force acting between the lock and the lock housing.

According to another aspect of the disclosed subject matter, a headrest lock guide assembly for removably securing a headrest assembly to a vehicle seat can include a lock housing including an inner surface defining a lock cavity, a lock body opening in communication with the lock cavity, a post opening having a post opening axis, the post opening being in communication with the lock cavity and configured to receive a headrest post extending along the post opening axis of the post opening, and a lock housing cover non-movably secured with respect to and adjacent the lock body opening, the lock housing cover including an outer surface, a cover abutment surface, and a tool passage having a tool passage axis, the cover abutment surface located adjacent the lock body opening, and the tool passage extends from the outer surface to the cover abutment surface. A lock can be located in the lock cavity and include a lock abutment surface and a post engagement member configured to selectively engage a portion of the headrest assembly to lock the portion of the headrest assembly within the lock guide assembly, the lock being movable within the lock cavity between a locked position in which the post engagement member extends into a portion of the post opening when viewed along the post opening axis, and an unlocked position in which the post engagement member is located further from the post opening axis than when the lock is in the locked position. A spring member can be located in the lock housing and configured to provide a spring force between the lock and the lock housing.

According to yet another aspect of the disclosed subject matter, a method for locking a headrest with respect to a seat of a vehicle can include providing a lock housing including an inner surface defining a lock cavity, the lock housing having a housing opening communicating with the lock cavity, a separate lock housing cover located adjacent and non-movably secured with respect to the housing opening, a post opening having a post opening axis, the post opening being in communication with the lock cavity and configured to receive a headrest post extending along the post opening axis, and a tool passage extending from an outer surface of the lock housing cover to the lock cavity along a tool passage axis. The method can also include providing a lock located in the lock cavity and including a lock abutment surface facing the tool passage and a post engagement member configured to selectively engage a portion of the headrest assembly to lock the portion of the headrest assembly within the lock housing. Furthermore, the method can include providing a spring member located in the lock housing and configured to provide a spring force acting between the lock and the lock housing, and providing a tool. The method can further include inserting the tool into the tool passage in the housing cover until the tool contacts the lock abutment surface of the lock, pressing against the spring force of the spring member to move the lock with respect to a portion of the spring member and the lock housing, and disengaging the post engagement member from the portion of the headrest assembly.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 is a plan view of a main guide body of the headrest lock guide of FIG. 2;

FIG. 5 is a perspective view of a main lock body of the headrest lock guide of FIG. 2;

FIG. 6 is a perspective view of a lock housing cover of the headrest lock guide of FIG. 2;

DETAILED DESCRIPTION OF EXEMPLARY EMBODIMENTS

Figure 1:
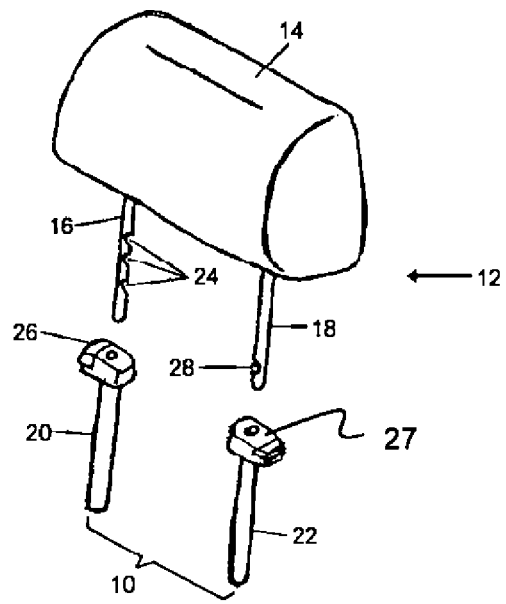
FIG. 1 is an exploded perspective view of a headrest adjustment and lock mechanism and a headrest assembly made in accordance with principles of the disclosed subject matter.

FIG. 1 illustrates an embodiment of a headrest adjustment and lock mechanism 10 for a headrest assembly 12 made in accordance with principles of the disclosed subject matter. The headrest adjustment and lock mechanism 10 can permit adjustment, locking and removal of the headrest assembly 12 relative to a vehicle seat (not shown) as will be described later.

The headrest assembly 12 can include a headrest 14 and a pair of headrest posts 16, 18 extending from the headrest 14. The headrest adjustment and lock mechanism 10 can include a first lock guide 20 and a second lock guide 22. The lock guides 20, 22 can be secured to a vehicle seat (not shown) in a manner known in the art. The lock guides 20, 22 can be configured and dimensioned to slidably receive a respective one of the headrest posts 16, 18 and to secure the headrest assembly 12 at one of a plurality of height positions relative to the vehicle seat.

With continued reference to FIG. 1, the first headrest post 16 can include a plurality of height adjustment notches 24 spaced along the length of the first headrest post 16. The first lock guide 20 can include a first locking structure 26 that is biased to selectively engage one of the height adjustment notches 24 in a manner that is known in the art. Thus, the headrest 14 can be selectively secured at a plurality of height positions relative to a vehicle seat.

The second headrest post 18 can include a lock notch 28 formed at a location on the second headrest post 18 that is below the lowermost of the height adjustment notches 24 on the first headrest post 16. When a user displaces the headrest assembly 12 upwardly so that the lowermost of the height adjustment notches 24 is repositioned above the first locking structure 26, a second locking structure 27 contained in the second lock guide 22 can engage the lock notch 28 to prevent removal of the headrest assembly 12 from the lock guides 20, 22, and consequently, from a vehicle seat. In order to remove the headrest assembly 12 from the lock guides 20, 22, a user can insert a tool T (FIG. 7) into a tool passage 29 (see FIGS. 6-8) in the second lock guide 22 to disengage a portion of a second locking mechanism from the lock notch 28 in a manner to be subsequently described. The tool passage 29 has a tool passage axis that extends in a direction in which the tool is to be inserted into the tool passage. In the disclosed embodiment, the tool passage axis coincides with the longitudinal axis of the of the tool passage 29. If the tool passage 29 does not have a longitudinal axis, the tool passage axis can coincide with a central axis of the tool passage in a direction of intended insertion of the tool T.

Figures 2, 3:
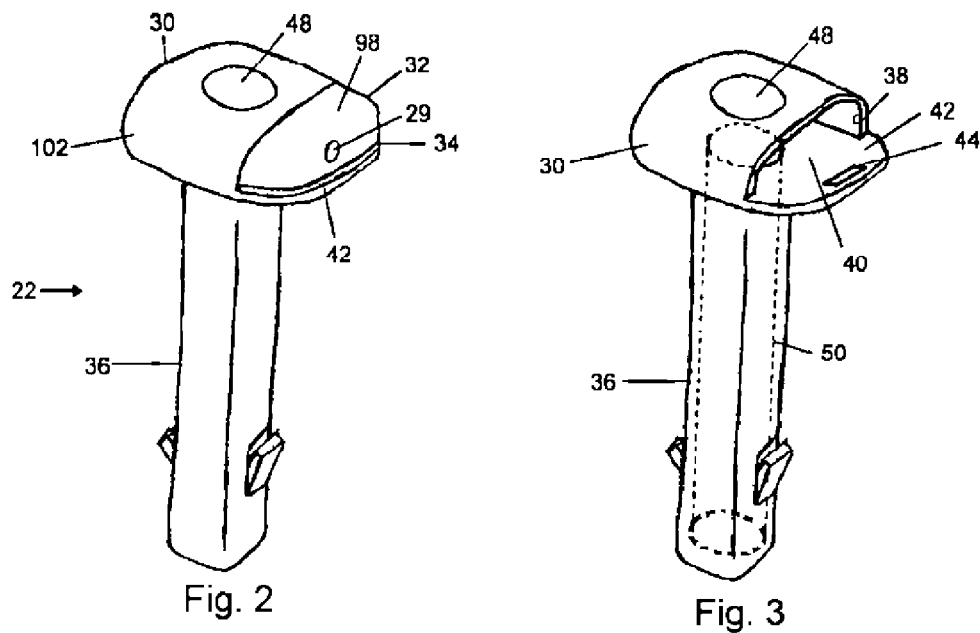
FIG. 2 is a perspective view of a headrest lock guide assembly of the headrest adjustment and lock mechanism of FIG. 1.
FIG. 3 is a perspective view of a lock housing of the headrest lock guide of FIG. 2.

FIG. 2 illustrates a fully assembled second lock guide 22 according to an embodiment of the disclosed subject matter. The second lock guide 22 can include a lock housing 30 that includes a lock housing cover 32. The guide 22 can also include a second locking structure portion 34, and a hollow post stem 36. The lock housing cover 32 can be integral with or separate and secured to an opening portion in the lock housing 30. The lock housing 30 and the lock housing cover 32 can cooperate to house the second locking structure. However, a portion 34 of a main guide body 52 can be exposed from an opening 40 in the lock housing 30.

In FIG. 3 the lock housing cover 32 and the second locking structure are removed from the lock housing 30 for purposes of clarity of description. The lock housing 30 can include an inner surface that defines a lock cavity 38, a lock body opening 40 in communication with the lock cavity 38, and a ledge 42 extending outwardly from the lock body opening 40. The width and height of the lock body opening 40 is equal to the width and the height of the lock cavity 38. The ledge 42 can include a tab opening 44 that can receive a resilient tab 46 (FIG. 6) of the lock housing cover 32 to non-movably secure the lock housing cover 32 with respect to a post opening 48 (or other structure) of the main portion of the lock housing 30. The post opening 48 is dimensioned and configured to slidably receive the second headrest post 18.

The lock housing cover 32 is shown as a separate structure that is locked in place adjacent an opening 40 in the lock housing 30. By the nature of this structural feature, a designer is able to easily re-design a typical push button head rest position lock (such as lock 26) to provide a tool activated headrest release lock (such as lock 27). Please note that a headrest position lock typically allows a user to position the headrest with respect to a vehicle seat, while a headrest release lock allows a user to remove the headrest from the vehicle seat. Thus, in a vehicle that already has a head rest position lock, only minor changes to both the molds that make each of the components of the position lock and the parts themselves may be necessary to arrive at the head rest release lock 27 made in accordance with the principles of the presently disclosed subject matter. Less re-tooling is necessary and the cost of manufacture of such a part is therefore reduced.

As illustrated in FIGS. 2 and 3, the hollow post stem 36 can extend from the bottom of the lock housing 30. Referring to FIG. 3, the hollow post stem 36 can include a through bore 50 configured and dimensioned to slidably receive the second headrest post 18 (FIG. 1). The through bore 50 is coaxial with the post opening 48 and is in communication with the lock cavity 38, as shown in FIG. 3.

Figure 7:
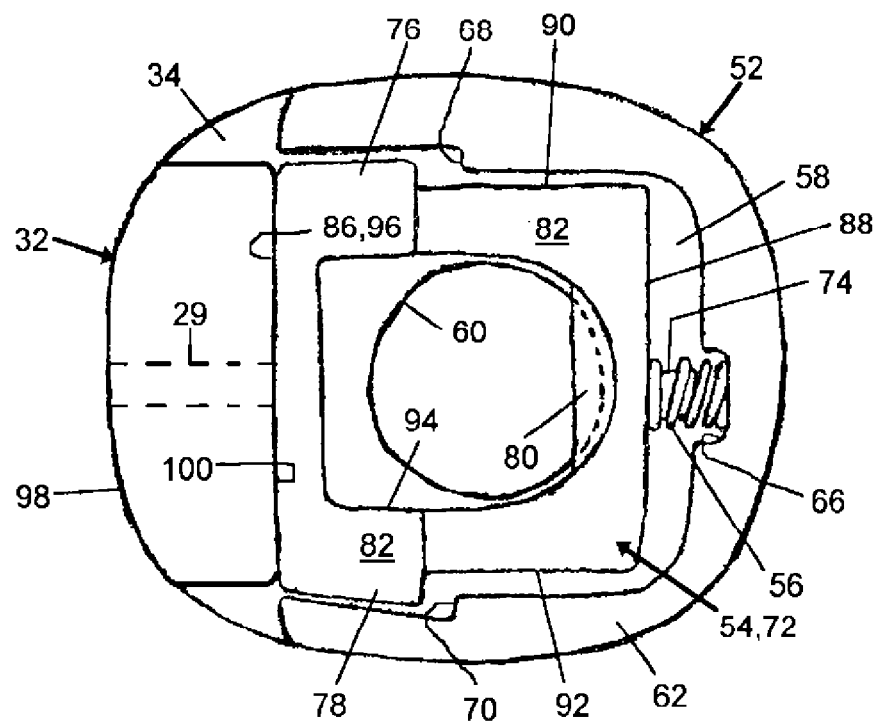
FIG. 7 is a plan view of the lock mechanism of FIG. 2 in the locked position.

Referring to FIG. 7, the second locking mechanism can include a main guide body 52, a lock 54 slidably received in/on the main guide body 52 and an elastic spring member, such as coil spring 56, acting on/between the lock 54 and the main guide body 52. As apparent from FIG. 3, the lock cavity 38 can receive the lock 54, the spring 56, and the main guide body 52 (except for portion 34).

FIG. 4 illustrates an embodiment of the main guide body 52 made in accordance with principles of the disclosed subject matter. The main guide body 52 can include a planar base 58, a main guide post opening 60, a U-shaped wall 62 and a tab opening 64.

The planar base 58 can include the portion 34 that extends outward of the lock cavity 38 along the ledge 42 of the lock housing 30. The tab opening 64 can be formed in the portion 34 of the planar base 58 to align with the tab opening 44 in the ledge 42 of the lock housing 30. Like the tab opening 44 in the ledge 42, the tab opening 64 in the planar base 58 can be configured and dimensioned to receive the resilient tab 46 of the lock housing cover 32 to non-movably secure the lock housing cover 32 to the lock housing 30. The interaction of the resilient tab 46 with the tab openings 44, 64 and alternatives thereto will be described in more detail later.

Figure 8:
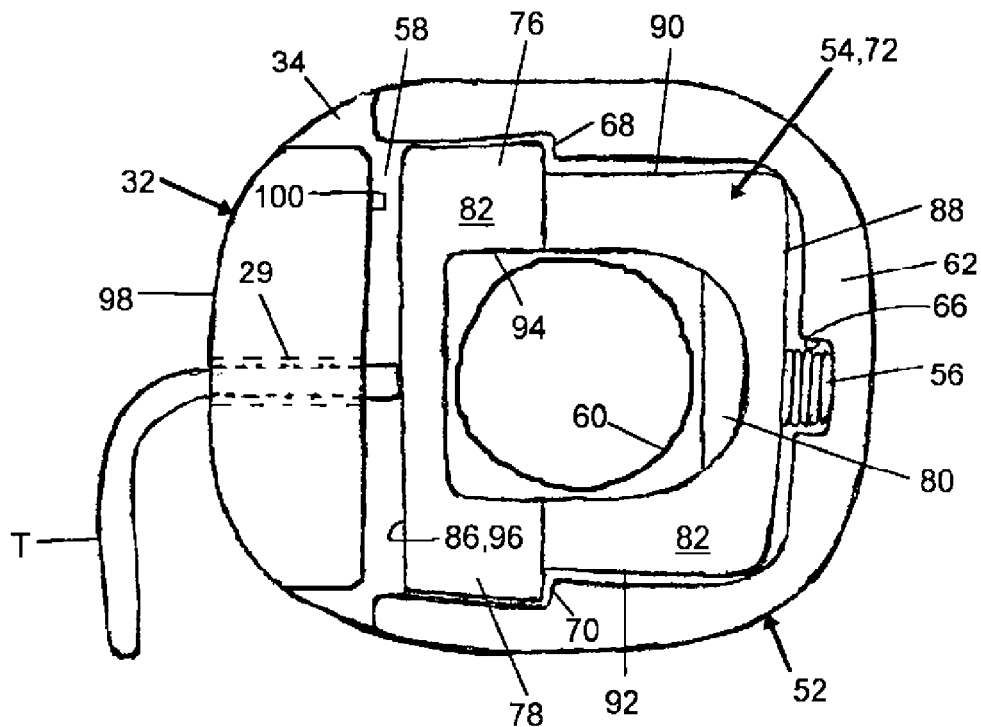
FIG. 8 is a plan view of the lock mechanism of FIG. 2 in the unlocked position.

As seen in FIGS. 4, 7 and 8, the main guide post opening 60 can be formed in the planar base 58, configured and dimensioned to slidably receive the second headrest post 18, and be coaxial with the post opening 46 and the through bore 50. The main guide post opening 60 is positioned within the extent of the U-shaped wall 62.

Returning to FIG. 4, the U-shaped wall 62 can extend upwardly from planar base 58 and along a portion of the periphery of the planar base 58 to form an upstanding wall offset from the base 58. The ends of the U-shaped wall 62 can terminate adjacent the portion 34 of the planar base 58. The entirety of the U-shaped wall 62 can be received in the lock cavity 38 with the open end of the U-shaped wall 62 adjacent the lock body opening 40. The U-shaped wall 62 can include a spring recess 66 formed in the base of the U-shaped wall 62 along with a pair of shoulders 68, 70 extending inwardly toward the main guide post opening 60. As shown in FIGS. 7 and 8, the spring recess 66 can be formed to receive and lock one end of the spring 56 therein.

FIG. 5 illustrates a perspective view from the bottom of the lock 54. The lock 54 can include a main lock body 72, a spring post 74, a pair of shoulders 76, 78, and a post engagement member 80. The main lock body 72, the spring post 74, the shoulders 76, 78 and the post engagement member 80 can be individually formed and then assembled together or these elements can be integrally molded to form the lock 54.

The main lock body 72 can include a top surface 82 (viewable in FIGS. 7 and 8), a bottom surface 84, a front surface 86, a rear surface 88, and a pair of side surfaces 90, 92. The bottom surface 84 is configured to slide along the planar base 58 of the main guide body 52 as the main lock body 72 moves between the locked position (FIG. 7) and the unlocked position (FIG. 8). The front and rear surfaces 86, 88 and the pair of side surfaces 90, 92 each extend between the top and bottom surfaces 82, 84. The side surfaces 90, 92 slide along the inner surfaces of the arms of the U-shaped wall 62 as the main lock body 72 moves between the locked position (FIG. 7) and the unlocked position (FIG. 8). In the locked position, the port engagement member 80 of the lock 54 engages the lock notch 28 in the post 18 to lock the headrest 14 relative to the seat back in both the up and downward directions, or at least in the upward direction to prevent removal of the headrest 14 from the seat back in which the lock guides 20, 22 are secured.

The main lock body 72 can also include an elongated D-shaped opening 94 extending through the main lock body 72 from the top surface 82 to the bottom surface 84. The elongated D-shaped opening 94 is configured and dimensioned such that: a) the main guide post opening 60 remains within the D-shaped opening 94; and b) the main lock body 72 does not interfere with the second headrest post 18 as the main lock body 72 moves between the locked position (FIG. 7) and the unlocked position (FIG. 8).

The spring post 74 can extend from the rear surface 88 of the main lock body 72. As shown in FIGS. 7 and 8, the spring post 74 receives the other end of the spring 56 and cooperates with the spring recess 66 to capture the spring 56 between the lock 54 and the main guide body 52. Referring to FIG. 7, the spring 56 biases the lock 54 toward the lock housing cover 32 in a direction parallel or substantially parallel to tool passage 29. Thus, the spring 56 biases the lock 54 into the locked position at which the post engagement member 80 locks/engages with the notch 28 of the post 18.

With further reference to FIG. 5, the pair of shoulders 76, 78 can extend from the side surfaces 90, 92, respectively, at a position on the respective side surfaces 90, 92 adjacent to the front surface 86. A lock abutment surface 96 can extend from one shoulder 76 to the other shoulder 78 and includes the front surface 86.

The post engagement member 80 can extend from the main lock body 72 into the elongated D-shaped opening 94 along an arcuate portion of the elongated D-shaped opening 94. The post engagement member 80 can be configured of a relatively harder material than the adjacent structures, and dimensioned to engage the lock notch 28 in the second headrest post 18 when the second lock mechanism 52, 54, 56 is in the locked position.

FIG. 6 illustrates a perspective view of the bottom of the lock housing cover 32. The lock housing cover 32 can include the tool passage 29, an outer surface 98, a cover abutment surface 100 and the resilient tab 46. The tool passage 29 extends from a portion of the outer surface 98 opposite the cover abutment surface 100 to the cover abutment surface 100. The tool passage 29 can also extend through the resilient tab 46. In this embodiment, the tool passage 29 terminates at the cover abutment surface 100 immediately adjacent the lock body opening 40. There is no intervening structure between the tool passage 29 and the lock body opening 40. As such, the tool passage 29 is in direct communication with the lock body opening 40.

It is noted that FIG. 6 illustrates the tool passage 29 extending through a portion of the lock housing cover 32 that is devoid of material. However, it should be understood that any or all portions of the lock housing cover 32 shown in FIG. 6 that are free of material can alternatively be filled with material or constitute a solid structure.

As shown in FIG. 2, the outer surface 98 of the lock housing cover 32 generally follows the contour of the outer surface 102 of the lock housing 30.

Returning to FIG. 6, the resilient tab 46 can include a plurality of lock tabs 104, 106, 108. A pair 104, 106 of the lock tabs 104, 106, 108 extends transversely to the tool passage 29. The front lock tab 108 can extend parallel with the tool passage 29 and away from the cover abutment surface 100. The length of the portion of the tab 46 between the bottom of the lock housing cover 32 and the lock tabs 104, 106, and 108 is approximately equal to the sum of the thicknesses of the ledge 42 and the portion 34 of the main guide body 52. The resilient tab 46 extends through both tab openings 44 and 64 and the lock tabs 104, 106, 108 extend outwardly of the tab openings 44, 64 and engage the bottom surface of the ledge 42 at a position beyond the tab opening 44 to lock the structures relative to each other in a non-movable fashion. Thus, the main guide body 52 and the lock housing cover 32 can be non-movably secured to the lock housing 30.

As stated above, the lock housing cover 32 is located in the lock body opening 40 to contain the lock 54 within the lock cavity 38. The cover abutment surface 100 of the lock housing cover 32 lies adjacent the lock body opening 40 of the lock housing 30. Although not illustrated in the drawing figures, the height of the cover abutment surface 100 can be equal to the height of the lock body opening 40. And the width of the cover abutment surface 100 can be approximately equal to the distance between the arms of the U-shaped wall 62. Thus, the cover abutment surface 100 cooperates with the U-shaped wall to encircle the lock 54. Referring to FIGS. 7 and 8, the width of the main guide body 52 as measured from the outer surfaces of the arms of the U-shaped wall 62 is approximately equal to the width of the lock body opening 40. Thus, the U-shaped wall 62 can cooperate with the lock housing cover 32 to block the lock body opening 40 and contain the lock 54 within the lock housing 30.

The operation of the second lock mechanism will now be described with reference to FIGS. 7 and 8. For clarity, only the second lock mechanism 52, 54, 56 and the lock housing cover 32 are illustrated.

FIG. 7 illustrates the lock 54 in the locked position where the post engagement member 80 engages the lock notch 28 in the second headrest post 18 to prevent removal of the second headrest post 18 from the second lock guide 22. The spring 56 biases the lock body 54 toward the lock housing cover 32 such that the lock abutment surface 96 engages the cover abutment surface 100, including a portion of the cover abutment surface 100 that immediately surrounds the tool passage 29. When in the locked position, the post engagement member 80 extends over a portion of the main guide post opening 60 and a portion of the through bore 50. In this position, the post engagement member 80 engages the lock notch 28 of the second headrest post 18. Engagement of the post engagement member 80 with the lock notch 28 locks the second headrest post 18 to the second lock guide 22 of the headrest adjustment and lock mechanism 10, and consequently, to a vehicle seat.

FIG. 8 illustrates the lock 54 in the unlocked position where the post engagement member 66 is disengaged from the lock notch 28 of the second headrest post 18 to permit removal of the headrest assembly 12 from the second lock guide 22 of the headrest adjustment and lock mechanism 10, and consequently, a vehicle seat. In order to displace the lock 52 from the locked position to the unlocked position, a user can insert the tool T into the tool passage 29 until the distal end of the tool T engages the lock abutment surface 96 of the main lock body 72. Further movement of the tool T into the tool passage 29 against the bias of the spring 56 can slide the main lock body 72 in a direction parallel or substantially parallel to the tool passage axis of the tool passage 29 from the locked position (FIG. 7) to the unlocked position. The main lock body 72 slides along the planar base 58 of the main guide body 52 toward the base of the U-shaped wall 62 until the shoulders 76, 78 of the main lock body 72 abut the respective shoulders 68, 70 of the U-shaped wall 62. When the lock body shoulders 76, 78 abut the wall shoulders 68, 70, the post engagement member 66 is positioned at a location outside the perimeters of the main guide post opening 60 and the through bore 50, and consequently, withdrawn from the lock notch 28 and the perimeter of the second headrest post 18. As shown in FIG. 8, when the lock body shoulders 76, 78 abut the wall shoulders 68, 70, the lock abutment surface 96 is spaced from the portion of the cover abutment surface 100 that immediately surrounds the tool passage 29.

While certain embodiments of the invention are described above, it should be understood that the invention can be embodied and configured in many different ways without departing from the spirit and scope of the invention. For example, the tool T can be formed as a straight pin, a key that acts to extend a second member that pushes on the main lock body 72, a splined structure that is unique in shape and effectively prevents unauthorized unlocking of the device without the specifically splined tool, etc. Any of the above referenced parts can be made integral with each other provided they are not required to move with respect to each other. The specific embodiment is only one way that the device can be parted out. The post engagement member 80 and the notch 28 could also be reversed and associated with the post 18 and main lock body 72, respectively. Shoulders 68 and 70 formed in the main guide body 52 can be replaced with many other and various stop limiting structures, including a variable stop structure that, in a first position, would allow the post engagement member 80 to be unlocked from only certain notches (e.g., notch 28) and in another position would allow the engagement member 80 to be unlocked from other additional notches. Although a lock tab 104 is shown for securing the lock housing cover 32 to the ledge 42 of the lock housing 30, various other locking structures could be incorporated without departing from the spirit and scope of the disclosed subject matter, including welds, screws, snap fits, adhesives, etc. In addition, the coil spring 56 is shown as a metal coil but it is contemplated that various other elastic devices could be used to impart the opposing force between the main lock body 72 and the main guide body 52 and/or main housing 30. For example, an elastic foam material could be located between these structures, a leaf spring, a rubber band spring, or integrated live hinge type springs could be molded directly into the parts themselves to provide the spring force. The lock 54 can be formed in two separate pieces, for example, broken up through each to the shoulders 76 and 78. This breaking up of the lock could be a first step in retrofitting a single knob type position locking structure for headrests with a release lock structure according to the presently disclosed subject matter.

While the tool T can be shaped like an allen wrench or other elongate structure such as a spline, keyway, etc., it is also contemplated to use a vehicle's ignition key for the tool T. The ignition key is convenient for use as tool T because substantially every vehicle has an ignition key. However, if the ignition key is used in its ordinary manner, the tool passage 29 (and possibly lock housing, etc.) of the headrest lock would require substantial change to provide for a matching unlock mechanism that could be actuated by the ignition key. Accordingly, it is also contemplated that the ignition key be used in a different manner than in its ordinary unlocking actuation manner. For example, the tool passage 29 can be formed as a slot that would receive substantially any ordinary ignition key. The ignition key would be inserted into the slot such that the tip of the ignition key contacts the lock abutment surface 96 to move the lock main body 72. The movement of the lock main body 72 would then actuate the lock to unlock the headrest, as described above.

Another method contemplated in the spirit of the disclosed subject matter is a method of retrofitting a single knob position lock structure into a two knob release lock structure in accordance with the above disclosed subject matter. Specifically, a single knob (comprising the lock housing cover 32 without lock tab 104 or tool passage 29 and integrated as a single structure with the main lock body 72) is operated by moving the knob by hand with respect to the main guide body 52 to unlock a position lock structure for a headrest. This single knob can be cut into two parts: a main lock body 72; and, a lock housing cover 32. The cut line forms the lock abutment surface 96 and the cover abutment surface 100, respectively. An attachment structure, such as lock tab 104 and tab opening 64 can be provided in the lock housing cover 32 and the main guide body 52, respectively. The lock housing cover 32 can be locked with respect to the main guide body 52 and lock housing 30 via this tab/opening (or other) attachment structure. A tool passage 29 can be provided in the lock housing cover 32 (which was previously the single knob that a user viewed and could move by hand with respect to the main guide body 52 to unlock a position lock structure). Now, a tool can be inserted in the tool passage 29 to cause the main lock body 72 to similarly slide (as it previously did by hand as a single knob) with respect to the main guide body 52 to unlock the post engagement member 80 from the notch 28 in the headrest post. Of course, this lock can function as either a position lock or a release lock depending on a particular application. The retrofit basically changes a hand activated single knob lock into a tool activated double knob (cover 32 and lock body 72) lock.

Certain headrest location locks include a two part lock structure including a button for depressing or moving by hand, and a lock mechanism within a lock housing located adjacent the button so that when the button is moved by hand, the lock is pressed or moved and caused to either activate or deactivate. In this case, it may be possible to simply redesign the button and/or housing so that the button can be secured with respect to the housing in a non-movable fashion. A tool passage can be provided through the structure formerly known as the button so that an operator can use a tool to contact and activate the lock located behind structure formerly known as the button.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A headrest lock guide assembly for removably securing a headrest assembly to a vehicle seat comprises:
   a lock housing including an inner surface defining a lock cavity, a post opening having a post opening axis, the post opening being in communication with the lock cavity and configured to receive a headrest post extending along the post opening axis through the post opening, and a tool passage extending from an outer surface of the lock housing to the lock cavity along a tool passage axis;
   a lock located in the lock cavity and including a lock abutment surface facing the tool passage and a post engagement member configured and dimensioned to selectively engage a portion of the headrest assembly to lock the portion of the headrest assembly within the lock, the lock being movable within the lock cavity between a locked position in which the post engagement member extends into a portion of the post opening when viewed along the post opening axis and an unlocked position in which the post engagement member is located further from the post opening axis than when the lock is in the locked position, the lock configured to move in a direction substantially parallel to the tool passage; and
   a spring member located in the lock housing and configured to provide a spring force acting between the lock and the lock housing.

2. The headrest lock guide assembly according to claim 1, wherein the lock abutment surface is spaced from the post engagement member.

3. The headrest lock guide assembly according to claim 1, wherein the lock housing includes a housing abutment surface that immediately surrounds the tool passage and the lock abutment surface engages the housing abutment surface when the lock is in the locked position, and the lock abutment surface is spaced from housing abutment surface when the lock is in the unlocked position.

4. The headrest lock guide assembly according to claim 3, further comprises a main guide body secured to the lock housing, the main guide body includes:
   a planar base;
   a main guide post opening coaxial with the post opening of the lock housing; and
   a U-shaped wall including an open end facing the housing abutment surface, the U-shaped wall extends upwardly from the planar base and around the main guide post opening; and
   wherein the open end of the U-shaped wall cooperates with the housing abutment surface to encircle the lock, and the lock slides along the planar base and within the U-shaped wall when the lock moves between the locked position and the unlocked position.

5. The headrest lock guide assembly according to claim 4, wherein the U-shaped wall includes a spring recess and the lock includes a spring post, a first end of the spring member is received in the spring recess and a second end of the spring member is mounted on the spring post.

6. The headrest lock guide assembly according to claim 4, wherein the U-shaped wall includes a pair of shoulders and the lock includes a pair of mating shoulders engaging a respective one of the U-shaped wall shoulders when the lock is in the unlocked position.

7. The headrest lock guide assembly according to claim 4, wherein the lock further comprises:
   a main lock body including a top surface, a bottom surface, a front surface extending between the top and bottom surfaces, a rear surface extending between the top and bottom surfaces, a pair of side surfaces extending between the top and bottom surfaces and between the front and rear surfaces, and a D-shaped opening extending from the top surface to the bottom surface, the D-shaped opening configured to surround the headrest post when the lock is in each of the locked position and the unlocked position;
   a first spring member attachment structure located at the rear surface of the main lock body, and spring member attachment structure located at the U-shaped wall of the main guide body; and
   a pair of shoulders extending from the side surfaces of the main lock body, respectively, the lock abutment surface extending between the pair of shoulders and including the front surface of the main lock body.

8. The headrest lock guide assembly according to claim 7, wherein the D-shaped opening includes an arcuate portion, and the post engagement member extends into the arcuate portion of the D-shaped opening.

9. The headrest lock guide assembly according to claim 7, wherein the lock housing includes a lock housing opening, a lock housing cover including a resilient tab, and a ledge extending outwardly adjacent the lock housing opening, the ledge includes a tab opening, and the lock housing cover being located adjacent the lock housing opening and secured in a non-movable fashion with respect to the post opening of the lock housing to enclose the lock cavity.

10. The headrest lock guide assembly according to claim 9, wherein a portion of the planar base extends beyond the ends of the U-shaped wall and along the ledge, the portion of the planar base includes a tab opening aligned with the tab opening of the ledge of the lock housing, and the resilient tab extends through the tab openings to non-movably secure the main guide body and the lock housing cover with respect to the post opening of the lock housing.

11. The headrest lock guide assembly according to claim 1, wherein the lock abutment surface is composed of a plastic material.

12. The headrest lock guide assembly according to claim 1, wherein the lock is configured to encircle the post opening axis, and the lock abutment surface and the post engagement member face in a same direction and are located on opposite sides of the lock with respect to the post opening axis.

13. The headrest lock guide assembly according to claim 1, further comprising a separate main guide body attached to the lock housing and having two substantially parallel walls extending upward from a base surface, the housing including a first portion and a second separate housing cover portion connected to the first portion and including the tool passage therein, and the lock configured to slide within the two substantially parallel walls of the main guide body.

14. The headrest lock guide assembly according to claim 1, wherein the tool passage axis extends through the lock abutment surface.

15. A headrest lock guide assembly for removably securing a headrest assembly to a vehicle seat comprises:
   a lock housing including an inner surface defining a lock cavity, a lock body opening in communication with the lock cavity, a post opening having a post opening axis, the post opening being in communication with the lock cavity and configured to receive a headrest post extending along the post opening axis of the post opening, and a lock housing cover non-movably secured with respect to and adjacent the lock body opening, the lock housing cover including an outer surface, a cover abutment surface, and a tool passage having a tool passage axis, the cover abutment surface located adjacent the lock body opening, and the tool passage extends from the outer surface to the cover abutment surface;
a lock located in the lock cavity and including a lock abutment surface and a post engagement member configured to selectively engage a portion of the headrest assembly to lock the portion of the headrest assembly within the lock guide assembly, the lock being movable within the lock cavity between a locked position in which the lock abutment surface lies immediately adjacent to the cover abutment surface and the post engagement member extends into a portion of the post opening when viewed along the post opening axis, and an unlocked position in which the lock abutment surface is spaced from the locked position and the post engagement member is located further from the post opening axis than when the lock is in the locked position; and
a spring member located in the lock housing and configured to provide a spring force between the lock and the lock housing;
wherein the lock body opening lies in a plane parallel to and intermediate each of the lock abutment surface and the cover abutment surface when the lock is in the unlocked position.

16. The headrest lock guide assembly according to claim 15, wherein the lock abutment surface is composed of a plastic material.

17. A headrest lock guide assembly for removably securing a headrest assembly to a vehicle seat comprises:
a lock housing including an inner surface defining a lock cavity, a lock body opening in communication with the lock cavity, a post opening having a post opening axis, the post opening being in communication with the lock cavity and configured to receive a headrest post extending along the post opening axis of the post opening, and a lock housing cover non-movably secured with respect to and adjacent the lock body opening, the lock housing cover including an outer surface, a cover abutment surface, and a tool passage having a tool passage axis, the cover abutment surface located adjacent the lock body opening, and the tool passage extends from the outer surface to the cover abutment surface;
a lock located in the lock cavity and including a lock abutment surface and a post engagement member configured to selectively engage a portion of the headrest assembly to lock the portion of the headrest assembly within the lock guide assembly, the lock being movable within the lock cavity between a locked position in which the post engagement member extends into a portion of the post opening when viewed along the post opening axis, and an unlocked position in which the post engagement member is located further from the post opening axis than when the lock is in the locked position; and
a spring member located in the lock housing and configured to provide a spring force between the lock and the lock housing,
wherein the lock is configured to move between the locked position and the unlocked position in a direction substantially parallel to the tool passage axis.

18. The headrest lock guide assembly according to claim 17, wherein the tool passage axis is substantially perpendicular to the lock abutment surface.

19. A headrest lock guide assembly for removably securing a headrest assembly to a vehicle seat comprises:
a lock housing including an inner surface defining a lock cavity, a lock body opening in communication with the lock cavity, a post opening having a post opening axis, the post opening being in communication with the lock cavity and configured to receive a headrest post extending along the post opening axis of the post opening, and a lock housing cover non-movably secured with respect to and adjacent the lock body opening, the lock housing cover including an outer surface, a cover abutment surface, and a tool passage having a tool passage axis, the cover abutment surface located adjacent the lock body opening, and the tool passage extends from the outer surface to the cover abutment surface;
a lock located in the lock cavity and including a lock abutment surface and a post engagement member configured to selectively engage a portion of the headrest assembly to lock the portion of the headrest assembly within the lock guide assembly, the lock being movable within the lock cavity between a locked position in which the post engagement member extends into a portion of the post opening when viewed along the post opening axis, and an unlocked position in which the post engagement member is located further from the post opening axis than when the lock is in the locked position; and
a spring member located in the lock housing and configured to provide a spring force between the lock and the lock housing;
wherein the lock housing includes a tab opening, and the lock housing cover includes a resilient tab that extends through the tab opening to non-movably secure the lock housing cover with respect to the post opening of the lock housing.

20. A method for locking a headrest with respect to a seat of a vehicle, comprising:
providing a lock housing including an inner surface defining a lock cavity, the lock housing having a housing opening communicating with the lock cavity, a separate lock housing cover located adjacent and non-movably secured with respect to the housing opening, a post opening having a post opening axis, the post opening being in communication with the lock cavity and configured to receive a headrest post extending along the post opening axis, and a tool passage extending from an outer surface of the lock housing cover to the lock cavity along a tool passage axis;
providing a lock located in the lock cavity and including a lock abutment surface facing the tool passage and a post engagement member configured to selectively engage a portion of the headrest assembly to lock the portion of the headrest assembly within the lock housing;
providing a spring member located in the lock housing and configured to provide a spring force acting between the lock and the lock housing;
providing a tool;
inserting the tool into the tool passage in the housing cover until the tool contacts the lock abutment surface of the lock;
pressing against the lock abutment surface with the tool to counter the spring force of the spring member and to move the lock with respect to a portion of the spring member and the lock housing; and
disengaging the post engagement member from the portion of the headrest assembly.

* * * * *